United States Patent [19]

Wuchenauer

[11] Patent Number: 4,571,940
[45] Date of Patent: Feb. 25, 1986

[54] CONTROL DEVICE FOR A HYDROSTATIC GEAR DRIVEN BY A DRIVE ENGINE

[75] Inventor: Johann Wuchenauer, Bibertal, Fed. Rep. of Germany

[73] Assignee: Hydromatik GmbH, Elchingen, Fed. Rep. of Germany

[21] Appl. No.: 693,814

[22] Filed: Jan. 22, 1985

Related U.S. Application Data

[63] Continuation of Ser. No. 377,167, May 11, 1982, abandoned.

[30] Foreign Application Priority Data

May 21, 1981 [DE] Fed. Rep. of Germany ....... 3120278

[51] Int. Cl.[4] .................................................. F16H 39/46
[52] U.S. Cl. .................................... 60/444; 60/443; 60/465
[58] Field of Search ............... 60/443, 444, 445, 447, 60/465, 487, 488; 91/469

[56] References Cited

U.S. PATENT DOCUMENTS

| | | | |
|---|---|---|---|
| 3,583,154 | 6/1971 | Utter | 60/444 |
| 3,587,765 | 6/1971 | McFarland et al. | 60/444 |
| 3,808,811 | 5/1974 | Lepelletier | 60/465 |
| 3,850,272 | 11/1974 | Reinecke et al. | 60/465 |
| 3,908,377 | 9/1975 | Riedhammer | 60/445 |
| 3,932,993 | 1/1976 | Riedhammer | 60/447 |
| 3,964,262 | 6/1976 | Patton | 60/447 |
| 3,977,424 | 8/1976 | Patton | 60/445 |
| 3,986,357 | 10/1976 | Hoffmann | 60/444 |
| 4,059,042 | 11/1977 | Bridwell et al. | 91/469 |
| 4,168,612 | 9/1979 | Nikolaus | 60/488 |

FOREIGN PATENT DOCUMENTS

| | | | |
|---|---|---|---|
| 2541398 | 3/1977 | Fed. Rep. of Germany | 60/444 |
| 1286655 | 8/1972 | United Kingdom | |

Primary Examiner—Charles T. Jordan
Assistant Examiner—Richard Klein
Attorney, Agent, or Firm—Fitzpatrick, Cella, Harper & Scinto

[57] ABSTRACT

A control device for a hydrostatic gear driven by a drive engine, such as an internal combustion engine, with an auxiliary pump which is driven synchronously with the drive engine, to produce a control pressure which is adjustable via a control valve and which is dependent on the speed of the drive engine. The control device also has further a pressure reduction valve located in the control line, to remove or shut off the control pressure depending upon an external parameter. In order to make possible, with such a control device, both a partial pressure reduction and a complete pressure reduction by hydraulic means without the aid of sensitive control rods, it is proposed in this invention that the pressure reduction valve have a servo valve spool which is adjusted by the external parameter.

5 Claims, 4 Drawing Figures

CONTROL DEVICE FOR A HYDROSTATIC GEAR DRIVEN BY A DRIVE ENGINE

This application is a continuation of application Ser. No. 377,167 filed May 11, 1982, now abandoned.

BACKGROUND OF THE INVENTION

1. Field of the Invention

This invention relates to a control device for a hydrostatic gear driven by a drive engine, preferably an internal combustion engine, with an auxiliary pump which also is driven, synchronously, with the drive engine to produce a control pressure which is adjustable via a control valve. The control pressure, which is dependent on the speed of the drive engine, is provided in a control line, which is connected to the setting mechanism of the hydro-pump and/or the hydro-motor of the hydrostatic gear. A pressure reducing valve (i.e. an "inch" valve) is in the control line to eliminate or shut-off of the control pressure depending on the presence of an external parameter. The invention also relates to a setting mechanism to reduce the control pressure when the drive engine attains a predetermined speed, depending on the position of a speed control element of the drive engine.

2. Description of the Prior Art

Control devices with a control valve as above described serve to use the pressure means which, for expediency, is also the working fluid of the hydrostatic gear, for the shifting of the two elements of the hydrostatic gear, i.e. the hydro-pump and/or the hydro-motor. In such case the pressure means is supplied by an auxiliary pump which is driven corresponding to the speed of the drive motor of the hydrostatic gear. Thus, an acceleration of the output shaft of the hydrostatic gear corresponding to the input speed of the gear (i.e. the speed of the drive engine) is possible through a certain control of the supply volume adjustment of the hydro-pump and/or the hydro-motor of the hydrostatic gear. Such a control device has become known, for instance, from the DE-AS 22 47 437, where the control valve is configured as a branching valve of a certain construction described therein where this branching valve, apart from the adjustment of the control pressure dependent on speed, is at the same time configured as a feed valve for the supply of operating fluid for the operating cycle of the hydrostatic gear in order to compensate for leakage losses. Claim 2 of DE-AS 22 47 437 describes that the initial bias force of the spring of the control valve (i.e. the branching valve) can be achieved based on parameters such as the pressure in the operating cycle of the hydrostatic gear, the rated speed of the drive engine, or by similar means. Accordingly it is possible by means of the the control valve to limit the control pressure depending on obtaining the rated speed or depending on the pressure in the operating circuit (i.e. depending on the torque trasmitted by the hydrostatic gear), in order to avoid overloading of the drive engine.

Thus, in the known control device, an operating cylinder of the setting mechanism of the hydro-pump is loaded, by means of the control valve, with a control pressure corresponding to the speed of the drive engine; and thus the hydro-pump of the hydrostatic gear is continously adjusted for a larger supply volume. Accordingly, increasing the rotational speed of the drive engine increases the supply capacity of the hydro-pump and thus increases rotational speed at the output shaft of the hydro-motor of the hydrostatic gear. Loading at the output shaft corresponds to an increase of the operating pressure in the operating cycle. This increasing operating pressure affects the setting mechanism via the hydro-pump and causes a readjustment of the hydro-pump to a smaller supply volume. Thus, a reduction of the supply volume in the hydrostatic gear is determined by two factors:

(1) increasing operating pressure in hydrostatic gear circuit; and
(2) reduction of the control pressure at the setting mechanism of the hydro-pump.

By use of these two factors it is possible to control the hydrostatic gear to maintain a constant transmitted torque.

Those skilled in the art understand that by lowering or reducing the drive engine speed as little as possible one obtains optimum utilization of the engine's drive power. Taking up additional power from the drive engine, for instance by using the hydrostatic gear as a drive means and using additional further operating hydraulic gear also as drive means to which additional further operating hydraulics are connected, can lead to a reduction of the drive motor speed and thus to a reduction of the control pressure as well as a reduction of the supply volume of the hydro-pump. To counteract such speed reduction, it is known to reduce the control pressure by mechanical activation of the control valve independently of the speed of the drive engine. This is known as "inch function." Strictly speaking, this process is called "partial inch function". In such case, for instance, the control valve is mechanically coupled with the accelerator pedal of the drive engine; and, starting with a certain speed along the path of movement of the accelerator pedal, the control curve relating the control pressure to speed is shifted to a lower nominal operating speed. This shift means that an unintentionally large speed reduction through overloading cannot occur. If further power utilization devices are operated by the drive engine, the power reserve thus created is available to the other power utilization devices.

Apart from the "partial inch function" described, those skilled in the art are also aware of "complete inch function." This is achieved either by mechanical activation at the control valve or by an additional pressure reduction valve (i.e. an "inch" valve). Here, the control pressure is shut off either by the control valve or by the "inch" valve, if this is desirable, dependent on an external parameter. This external parameter can be, for instance, a signal, which is given when a brake is activated which slows down the power consuming device driven by the hydrostatic gear. Thus, it is known, for instance, to activate a pressure reduction valve ("inch" valve) with the brake fluid from the braking system of the vehicle, if the drive engine with a hydrostatic gear is used as a drive mechanism in a vehicle.

In summary it will be understood that in control devices of the type described above, "partial inch function" means to set the control pressure at a predetermined level which is lower than that which would correspond to the speed of the drive engine, while "complete inch function" means a complete reduction (i.e. shut-off) of the control pressure, so that the hydro-pump is shifted toward zero supply volume.

In practical applications, the mechanical activation at the control valve dependent on a speed control element of the drive engine to achieve a partial inch function has proven to have many problems. Mechanical activation via rods during usage under severe operating conditions cannot be avoided. Such retro-adjustments outside the manufacturing plant are difficult and unsatisfactory for the complete control device of such an apparatus.

A mechanical activation of the control valve or of a separate pressure reduction valve (i.e. an "inch" valve) to achieve complete reduction ("complete inch function") does not pose any basic problems, since complete reduction ("complete inch function") constitutes a shifting process to shut-off the control pressure and not a control process to shift a control characteristic as is the case with partial reduction (partial "inch function").

SUMMARY OF THE INVENTION

This invention has as one objective to provide a control device of the type described in which both partial pressure reduction ("partial inch function") and complete pressure reduction ("complete inch function") are carried out by hydraulic means without the need of delicate control rods.

To solve this task, this invention proposes to provide a control device of the type described above, in which a pressure reduction valve to achieve complete reduction ("complete inch function") and a control device to achieve partial reduction ("partial inch function") such that the pressure reduction valve (i.e. "inch" valve) has a servo valve spool which separates a first control chamber connected to a supply of control pressure and a second control chamber connected to a drain outlet and which, via reciprocally opening or closing restrictors, connects the control pressure line leading to the setting mechanism of the hydro-pump and/or the hydro-motor to the first and/or second control chamber, and wherein the servo valve spool has a piston area with an associated cylinder chamber via which the servo valve spool can be loaded with control pressure in the direction of opening the control pressure line to drain against the force of its compression spring which can be set by the external parameter. The cylinder chamber is connected to the control pressure line leading to the setting mechanism via a check valve which opens in the direction of flow to the cylinder chamber and a two-way valve parallel to the check valve. The two-way valve is opened and closed according to operation of the speed control element of the drive engine.

The configuration of the pressure reduction valve ("inch" valve) and its switching make it possible initially to transmit both partial and complete reduction to the pressure reduction valve or the two-way valve as pure switching processes. To achieve a partial pressure reduction, the two-way valve is opened or closed by the speed control element of the drive engine. For a complete pressure reduction, the force of the compression spring acting on the servo valve is adjusted, for instance, by activating an operating brake.

If the switching state "partial reduction" (i.e. partial inch function) exists at the two-way valve, the actual partial reduction control process is completely self-activating due to the fact that the control pressure in the control pressure line dependent on the rotational speed also builds up in the cylinder chamber of the piston areas associated with the servo valve spool and shifts the servo valve spool against the force of the compression spring in such a way that the control pressure is reduced by the restrictors which open or close reciprocally, which corresponds to a lower rotational speed of the drive engine. The change of the position and form of the control curve or control characteristic in the case of a partial reduction ("partial inch function") depends on the presettable characteristic of the compression spring acting upon the servo valve spool and the opening ratio of the restrictors which reciprocally open and close.

When proceeding from a control state in which the control pressure corresponds to the actual rotational speed, or when proceeding from the control state in which partial pressure reduction or a complete pressure reduction is initiated by reducing the force of the compression spring acting upon the servo control spool due to the corresponding parameter assuming a predetermined conditon, the servo control spool becomes immediately shifted to a position in which the control means supply is shut off by the restrictors which reciprocally open and close and the control pressure present in the control pressure line is immediately reduced. Thus, one and the same pressure reduction valve accomplishes a partial pressure reduction and a complete pressure reduction by hydraulic means without the two reducing functions hindering one another.

For expediency, the invention is arranged so that the check valve and the two-way valve are combined functionally in the form of a releasable check valve, where the valve is latched and released depending on the position of the speed control element.

BRIEF DESCRIPTION OF THE DRAWINGS

A preferred embodiment of the invention has been chosen for purposes of illustration and description, and is shown in the acompanying drawings, forming a part of the specification, wherein.

The invention described herein has been built and tested.

DETAILED DESCRIPTION OF THE PREFERRED EMBODIMENT

Figure 1:
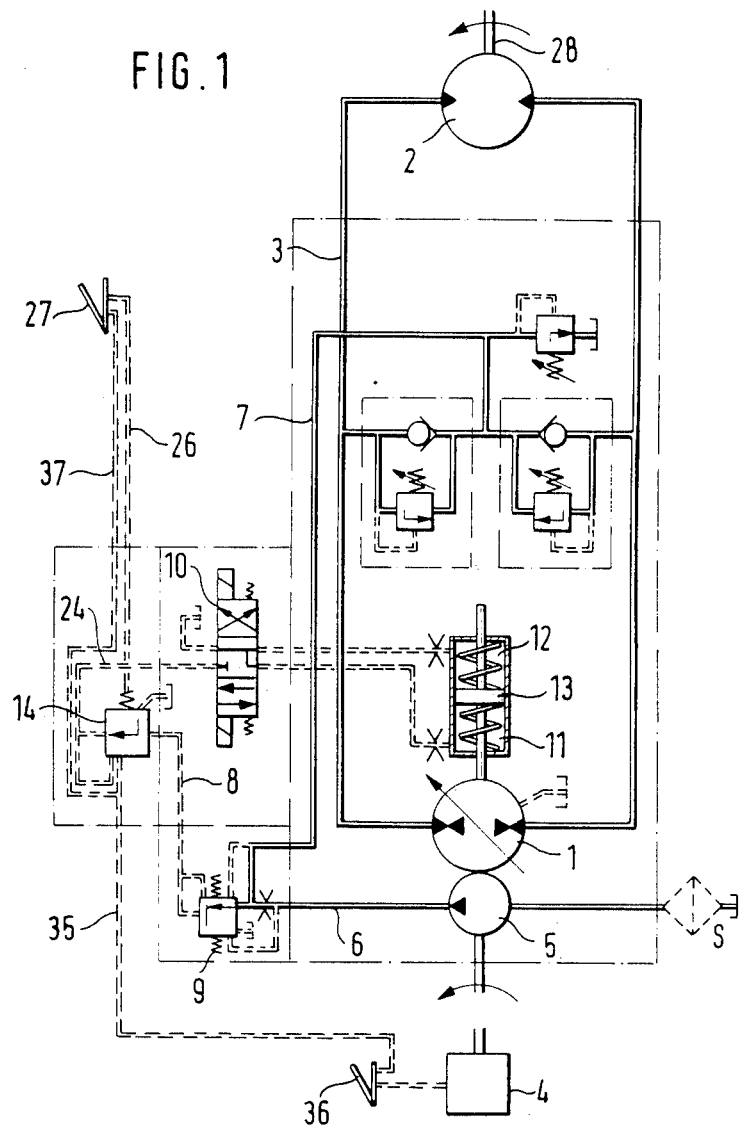
FIG. 1 is a diagram of a hydrostatic transmission with a control device according to the present invention.

The hydrostatic transmission shown in FIG. 1 consists of a hydro-pump 1 and a hydro motor 2, which, in the embodiment shown, operate in a closed operating circuit whose lines are designated at 3. The hydro-pump 1 is rotary-driven by a drive engine 4, preferably an internal combustion engine. Together with the hydro-pump 1, an auxiliary pump 5 also is rotary-driven to supply, via a line 6, hydraulic fluid, preferably hydraulic oil, to a supply line 7 and a control line 8. The supply line 7 leads to feed valves to refeed the hydraulic fluid to the operating circuit of the hydraulic transmission, formed by the line 3. This part of the switching is not described in detail, since it is well known and is not the subject of this invention.

In line 6, there is a control valve 9, which supplies an oil stream to the line 7 and which builds up a control pressure in the control line 8. Depending on its construction, the control valve 9 has a certain proportionate dependence on the control pressure in the line 6 and thus on the rotational speed of the drive engine 4. The configuration of the control valve 9 and the control function can, for instance, correspond to the control device described in DE-AS 22 47 437 or to the control valve described therein. The control line 8 leads, via a two-way valve 10 and, depending on the position of this two-way valve, to one or the other cylinder chambers 11, 12 on opposite sides of a servo control piston 13 of a setting mechanism for the feed volume adjustment of the hydro-pump 1.

In the control line 8, there is provided a pressure reduction valve ("inch" valve) 14, which executes the pressure reducing function ("inch" function) of the present invention. The pressure reduction valve 14 is shown in greater detail in FIG. 2. In a valve body 15, a servo valve spool 16 is arranged which separates a first control chamber 17 and a second control chamber 18. The second control chamber 18 is connected with a drain outlet 19. The servo valve spool 16 has control edges 20 and 21, which define restrictors 22 and 23 between which a control pressure line 24 opens. As can be seen, the restrictors 22 and 23 are reciprocally changeable by a corresponding shifting of the servo valve spool 16.

Figure 2:
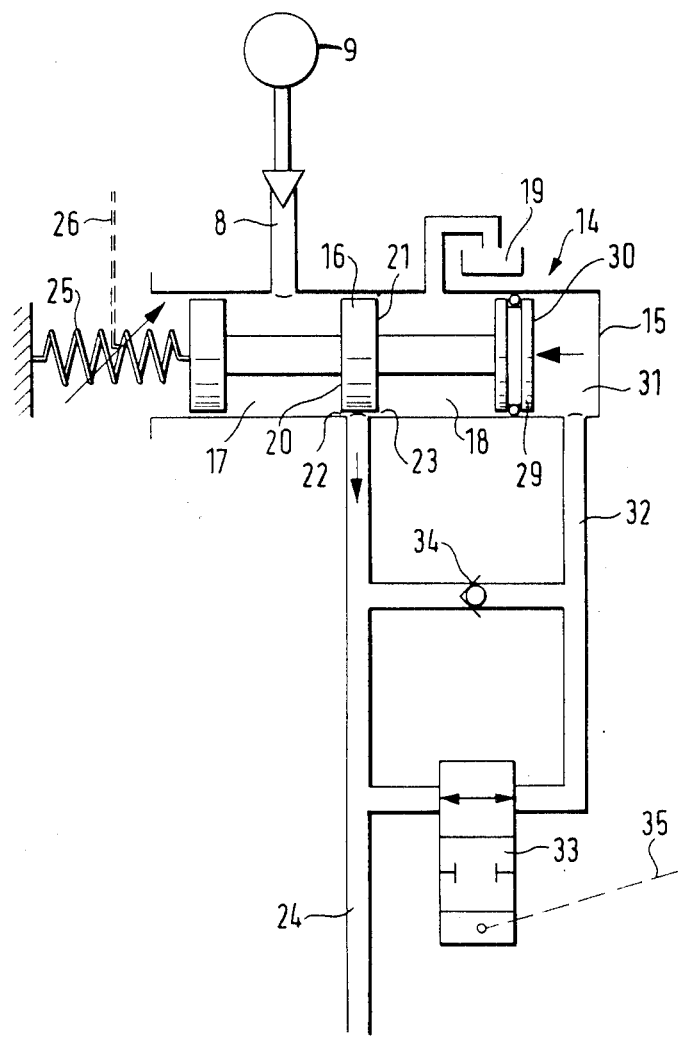
FIG. 2 is an enlarged sectional schematic of a pressure reduction valve and its switching arrangement used in the transmission control device of FIG. 1.

As shown in FIG. 2, the servo valve spool 16 is maintained under stress on its left side by a compression spring 25, and this stress is initially applied to the right in FIG. 2. The force of spring 25 is adjustable, as is known in the art; and it is controlled, via a control connection 26, by mechanical, hydraulic or electrical means dependent on an external parameter, for instance, the position of a brake pedal 27 of a device (vehicle, machine, or the like) which is driven by the hydrostatic gear 1, 2 via its output shaft 28.

Figure 4:
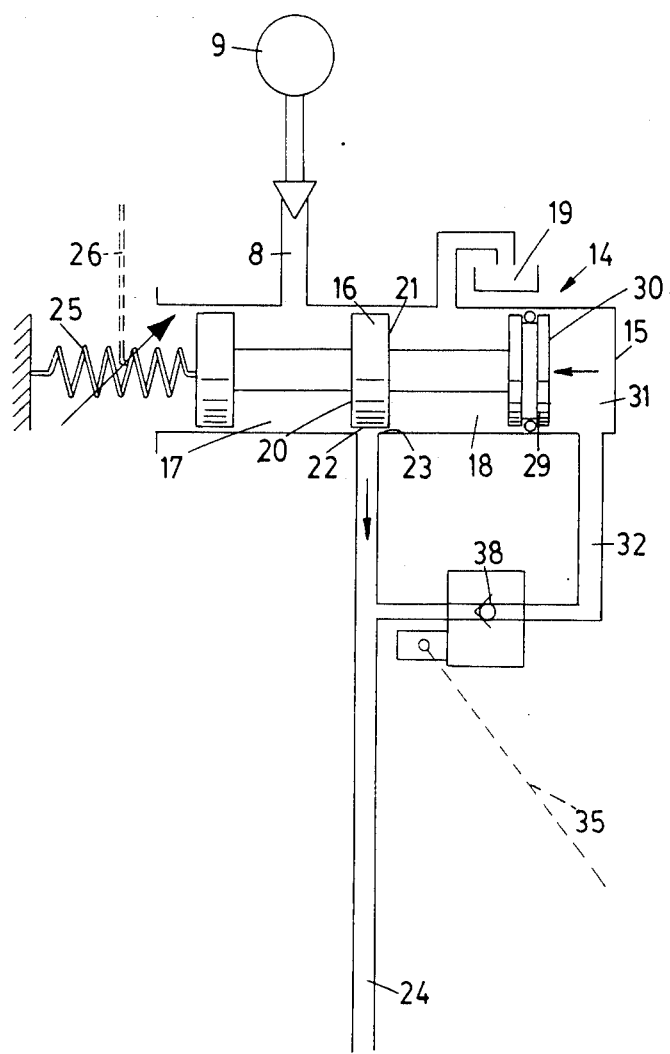
FIG. 4 is an enlarged sectional schematic of an alternative arrangement of a pressure reduction valve and its switching arrangement for use in the transmission and control device of FIG. 1.

As shown in FIG. 2, the servo valve spool 16 has a piston part 29 which has a piston area 30, which defines a cylinder chamber 31. The cylinder chamber 31 is connected with the control pressure line 24 via a control line 32 and via a two-way valve 33 and a check valve 34 parallel to the two-way valve. The check valve 34 opens in the direction of the cylinder chamber. The two-way valve 33 has two positions, opened and closed; and it is connected, for instance, via an electrical control line 35, with the speed control element 36 of the drive engine 4, for instance, the accelerator pedal 36 of the drive engine 4; so that the two-way valve 33 will be switched to open and closed positions depending on the position of accelerator pedal 36. Via a further control line 37, which can also be an electrical connection, the two-way valve 33 is connected with the brake pedal 27 and can be switched to its two positions depending on the position of the brake pedal. The check valve 34 and the two-way valve 33 can also be functionally combined in the form of a releasable check valve 38, as shown in FIG. 4, whereby latching and releasing of the valve is affected by a signal in the control line 35.

The operation of the control device of the present invention will now be described.

It will first be assumed that, initially, the internal combustion engine 4 is idling. At this time the accelerator pedal 36 is released. The hydro-pump 1 is set to zero stroke; and at this setting its low supply volume merely compensates for leakage losses. No pressure is built up in operating circuit 3; and the hydro-motor 2 remains at rest. In the pressure reducton valve 14, servo valve spool 16, according to FIG. 2, is biased to the right under the force of the compression spring 25. The control edge 21 of the valve spool 16 has closed the restrictor 23. The restrictor 22 is opened by control edge 20. The control line 8 and the control pressure line 24 are connected, the check valve 34 is closed and the two-way valve 33 is open. No control pressure is built up in the lines 8 and 24.

If the accelerator pedal 36 is now depressed to increase the speed of the drive engine 4, a signal will be produced in control line 35 to close the two-way valve 33. The drive engine 4 drives the auxiliary pump 5 with increasing speed, and the auxiliary pump, in turn, produces a control pressure in the control line 6 and, depending on the construction of control valve 9, in the control line 8 as well. This control pressure is dependent on the rotational speed of the drive engine 4. A corresponding control pressure occurs in the control pressure line 24, since the restrictor 22 is open.

This control pressure also builds up, via the check valve 34, in the line 32 and in the cylinder chamber 31. This pressure acts on the piston area 30 and shifts servo valve spool 16 in FIG. 2 to the left against the force of the spring 25.

1. Partial Pressure Reduction

If further depression of the accelerator pedal 36 increases the speed of the drive engine 4, and thus the control pressure in line 8 and in the control pressure line 24 as well as in the cylinder chamber 31, to such an extent that the spool 16 is pushed so far to the left against the force of the spring 25 that the control edge 21 opens the restrictor 23, the control pressure in line 24 becomes reduced. Since both restrictors 22 and 23 are open in a certain ratio, a control pressure gradient occurs between the line 8, the control pressure line 24 and the cylinder chamber 31. If the engine drive speed and thus the control pressure in line 8 continue to increase proportionately, the control pressures in the line 24 and in the cylinder chamber 31 increase only to an extent which is dependent on the opening ratio of restrictors 22 and 23 as well as on the characteristic curve of the compression spring 25.

If the compression spring 25 has a flat characteristic curve, i.e. if it is soft, the control pressures in the line 24 and in the cylinder chamber 31 increase only a little versus a large increase of control pressure in the line 8 (in case of a further increase of speed of drive engine 4). Thus, the control pressure ratio in lines 8 and 24 depends on the stiffness of the compression spring 25. Correspondingly, the control pressure ratio is determined by the opening ratio of the restrictors 22 and 23. As a result, starting with a predetermined speed of the drive engine 4, the speed-proportionate control pressure in line 8 is reduced, so that in the control pressure line 24 the control pressure acting on the setting mechanism of the hydro-pump 1 is lower than it would be if it corresponded to the actual engine speed.

If there is a speed reduction at the drive engine 4 due to too large a power output at the output shaft 28 of the hydrostatic transmission, the control pressure in line 8 will be reduced with this speed reduction. However, the servo valve spool 16 remains in its last position, since the check valve 34 prevents a reduction of the control pressure in the cylinder chamber 31.

It will be noted that the two-way valve 33 continues to be closed since the accelerator pedal 36 is activated to its position corresponding to acceleration. Since the servo valve spool 16 remains in position, the restrictors 22 and 23 act as firm restrictors which reduce the control pressure in the line 8 according to a fixed ratio.

With this load-dependent speed reduction, the control pressure in the line 8 is reduced, and the control pressure in the line 24 is also reduced, so that the hydropump 1 is set to a lower supply volume as a reaction to the load at output shaft 28.

If now the accelerator pedal 36 is released, the two-way valve 33 opens. The control pressure in the cylinder chamber 31 can now decrease. The speed of the drive engine 4, and correspondingly the control pressure in the line 8 decrease. The servo valve spool 16 controls the control pressure in the control pressure line 24 corresponding to the characteristic curves given by the spring 25 and the opening ratio of the restrictors 22 and 23.

2. Complete Pressure Reduction

For complete pressure reduction the control pressure in the line 24 has to be reduced immediately, in order immediately to reset the hydro-pump of the hydrostatic transmission. For instance, if no more power is to be supplied to the apparatus driven via output shaft 28 of the hydro-motor 2, such as when that apparatus (e.g., a vehicle), is being slowed down by braking, such immediate pressure reduction must be provided. This shut-off of the control, pressure in the control line 24 is accomplished by compressing the compression spring 25. At the same time, the two-way valve 33 is opened via the control connection 37, when the brake pedal 27 is depressed.

When the brake pedal 27 is depressed, the compression spring 25 is compressed via the control connection 26. Thus, the servo spool valve 16 can close the restrictor 22 with its control edge 20; and the control pressure in the control pressure line 24 can immediately decrease via the opened restrictor 23 toward the outlet 19. If the brake pedal 27 is no longer depressed, the compression spring 25 resumes its function without change and applies a bias to the servo valve spool 16.

Figure 3:
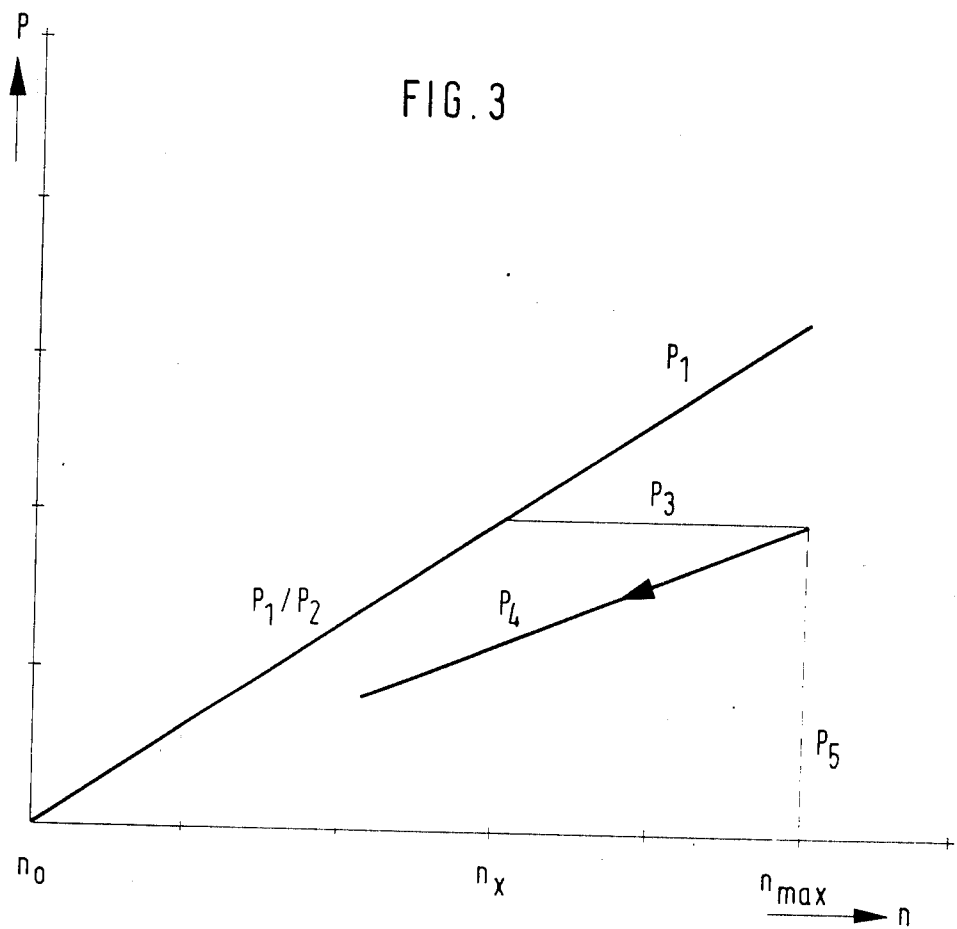
FIG. 3 is a group of pressure curves showing the control pressure dependent on the rotational speed of the drive engine without and with a pressure reducing function.

FIG. 3 shows a schematic of the distribution of control pressures which occur in the control pressure line 24 depending upon the speed of drive engine 4. The abbreviations used in FIG. 3 are explained as follows:

n—rotational speed of drive engine 4;
$n_{max}$—maximum rotation speed of drive engine 4;
P—control pressure;
$P_1$—speed-proportionate pressure in the control line 8;
$P_2$—speed-proportionate control pressure in the control pressure line 24;
$P_3$—the pressure reducing function, (i.e., a control pressure in the control pressure line 24 which is reduced when a predetermined speed $n_x$ is reached);
$P_4$—the control pressure in the control pressure line 24 during partial pressure reduction; i.e. in case of speed reduction of the drive engine 4, due to overload; and
$P_5$—control pressure reduction during complete pressure reduction.

When the accelerator (i.e., the speed control mechanism) 36 is depressed and released, the control pressure in the control pressure line 24 is controlled along the curves $P_2$ and $P_3$. If the drive engine 4 is overloaded due to too high an output reduction at the output shaft 28 of the hydrostatic transmission, the control pressure is adjusted along the line $P_4$.

In case of a complete pressure reduction, as described above, the control pressure is immediately decreased, approximately corresponding to the curve $P_5$.

The device according to the invention makes possible a fully hydraulic partial pressure reduction and complete pressure reduction. In case of a partial pressure reduction, due to the switching position of the two-way valve 33, it is automatically differentiated if there is a desired reduction of drive engine 4 (e.g. releasing the accelerator) or a true reduction of the rotational speed due to power overload.

As shown in FIG. 4, the check valve and the two way valve are combined functionally in the form of a releasable check valve 38, where the valve is latched and released depending on the position of the speed control element 35.

I claim:

1. In combination, a hydrostatic transmission driven by a drive engine having a movable speed control element, a control device for the hydrostatic transmission, a hydro-pump and/or hydro-motor having a setting mechanism, an auxiliary pump which is driven synchronously with the drive engine to produce a control pressure which is adjustable via a control valve and which is dependent on the speed of the drive engine, the control pressure being present in a control line which is connected to the setting mechanism of the hydro-pump and/or hydro-motor of the hydrostatic transmission, the control device comprising a pressure reduction valve provided in the control line and externally controllable to shut off the control pressure, the pressure reduction valve comprising a servo valve spool which separates a first control chamber connected to said auxiliary pump and a second control chamber connected to a pressure drain and which, via reciprocally opening or closing restrictors, selectively connects the portion of the control line leading to the setting mechanism of the hydro-pump and/or hydro-motor to either or both of the first and second control chambers, the servo valve spool having a piston area with an associated cylinder chamber via which the servo valve spool can be loaded with control pressure in the direction of opening of the control line to the pressure drain against the force of a compression element, means arranged to adjust the force of said compression element against said servo valve spool to shut off the control pressure, the cylinder chamber being connected to the portion of the control line leading to the setting mechanism via a check valve opening in the direction of flow to the cylinder chamber, a two-way valve parallel to the check valve, and two-way valve control means for opening and closing the two-way valve in response to the operation of the speed control element of the drive engine whereby said means arranged to adjust the force of said compression element and said two-way valve control means act independedently upon the overall pressure reduction valve.

2. A control device as set forth in claim 1 wherein the check valve and the two-way valve are functionally combined in the form of a releasable check valve, whereby latching and release of the check valve takes place depending on the position of the speed control element.

3. A control device as set forth in claim 1 wherein the speed control element is an accelerator of the drive engine, with which the two-way valve is switched to its closed condition when the accelerator is moved to increase engine speed and is switched to its open condition when the accelerator is moved to decrease engine speed.

4. A control device as set forth in claim 2 wherein the speed control element is an accelerator of the drive engine, with which the check valve is released when the accelerator is moved to increase engine speed and is latched in its open state when the accelerator is moved to decrease engine speed.

5. A control device as set forth in any one of claims 1 to 4 wherein the force of the compression spring acting upon the servo valve spool is reduced in response to a predetermined movement of the means arranged to adjust the force of said compression element against the servo valve spool.

* * * * *